United States Patent
Lin

(10) Patent No.: US 7,607,201 B2
(45) Date of Patent: Oct. 27, 2009

(54) MULTI-SECTION HINGE MECHANISM

(75) Inventor: Chun-jen Lin, Tu-Cheng (TW)

(73) Assignee: FIH (Hong Kong) Limited, Kowloon (HK)

( * ) Notice: Subject to any disclaimer, the term of this patent is extended or adjusted under 35 U.S.C. 154(b) by 544 days.

(21) Appl. No.: 11/450,193

(22) Filed: Jun. 9, 2006

(65) Prior Publication Data

US 2007/0062002 A1 Mar. 22, 2007

(30) Foreign Application Priority Data

Sep. 16, 2005 (CN) .......................... 2005 1 0037361

(51) Int. Cl.
*E05D 11/10* (2006.01)

(52) U.S. Cl. ............................. 16/330; 16/334; 16/342

(58) Field of Classification Search ........... 16/337–339, 16/342, 330, 303, 374, 376, 377, 340, 329, 16/334–336; 361/680–683, 814; 455/90.3, 455/575.1, 575.3, 575.8; 379/433.12, 433.13; 348/373, 333.01, 333.06, 794; 248/917–922, 248/125.1, 125.8, 278.1

See application file for complete search history.

(56) References Cited

U.S. PATENT DOCUMENTS

| | | | | | |
|---|---|---|---|---|---|
| 3,586,355 | A | * | 6/1971 | Magi | 403/91 |
| 4,186,905 | A | * | 2/1980 | Brudy | 248/478 |
| 5,109,572 | A | * | 5/1992 | Park | 16/334 |
| 5,600,870 | A | * | 2/1997 | Fields et al. | 16/342 |
| 5,765,263 | A | * | 6/1998 | Bolinas et al. | 16/342 |
| 6,264,392 | B1 | * | 7/2001 | Wise et al. | 403/112 |
| 2001/0032375 | A1 | * | 10/2001 | Patterson et al. | 16/334 |
| 2005/0278894 | A1 | * | 12/2005 | Lin et al. | 16/334 |

* cited by examiner

*Primary Examiner*—Chuck Y. Mah
(74) *Attorney, Agent, or Firm*—Steven M. Reiss

(57) ABSTRACT

A multi-section hinge mechanism includes a shaft (10), a rotary member (20), and an elastic member (30). The rotary member defines a through hole (26) running through the disk. The shaft is rotatably received in the through hole. The rotary member defines a plurality of concaves (282) in an inner circumferential surface portion thereof. The elastic member includes an elastic arm (32) and a fixing portion. The elastic arm engages in one of the concaves of the rotary member. The shaft non-rotatably connects with the fixing portion of the elastic member.

19 Claims, 4 Drawing Sheets

MULTI-SECTION HINGE MECHANISM

TECHNICAL FIELD

The present invention relates to hinge mechanisms, and particularly to a multi-section hinge mechanism for use in foldable electronic devices such as mobile telephones, electronic notebooks, and the like.

BACKGROUND

With the development of wireless communication and information processing technologies, portable electronic devices such as mobile telephones and electronic notebooks are now in widespread use. These electronic devices enable consumers to enjoy high technology services anytime and anywhere. Consumers particularly favor foldable electronic devices due to their convenience and ease of storage.

Generally, a foldable electronic device has most of the electronics in one housing, called the body. The other housing, called the cover, normally contains fewer electronic components than the body. Other foldable electronic devices have all the electronics in the body, with the cover containing no electronics. Various types of hinge mechanisms are used to join a body and a cover of a foldable electronic device, so that the cover can unfold up from and fold down upon the body. Nowadays, hinge mechanisms with one or more springs are preferred by many users. Although suitable for some foldable radiotelephones, a hinge mechanism with a spring is not suitable for certain miniaturized foldable radiotelephones. This is because the housing of a miniaturized radiotelephone may not have sufficient bulk to sturdily withstand the forces generated by the spring. For these miniaturized radiotelephones it is necessary to increase the size of the housing so that it has sufficient bulk to withstand the forces generated by the spring. This in effect increases the longitudinal size of the hinge mechanism, thus increasing the overall volume of the foldable electronic device.

Furthermore, with the development of the technologies of video, image and vocal communications, foldable electronic devices having cameras installed therein have become popular. Photographic image data obtained by the camera can be transmitted by the foldable electronic device in real time. The camera may be mounted in a main body or in a cover of the foldable electronic device. Alternatively, the camera may be mounted in the hinge mechanism installed between the body and the cover. This enables the camera to be rotated within a range of angles, in order to conveniently point the camera in different directions to take desired photographs. However, the photographing part cannot rotate independently from the upper case, and thus cannot rotate to and be oriented in any desired direction.

What is needed, therefore, is a hinge assembly which overcomes above-described shortcomings.

SUMMARY

In a first preferred embodiment, a multi-section hinge mechanism comprises a shaft, a rotary member, and an elastic member. The rotary member defines a through hole running through the disk. The shaft is rotatably received in the through hole. The rotary member defines a plurality of concaves in an inner circumferential surface portion thereof. The elastic member includes an elastic arm and a fixing portion. The elastic arm engages in one of the concaves of the rotary member. The shaft non-rotatably connects with the fixing portion of the elastic member.

Other advantages and novel features will become more apparent from the following detailed description when taken in conjunction with the accompanying drawings.

BRIEF DESCRIPTION OF THE DRAWINGS

Many aspects of the multi-section hinge mechanism can be better understood with reference to the following drawings. The components in the drawings are not necessarily drawn to scale, the emphasis instead being placed upon clearly illustrating the principles of the present multi-section hinge mechanism. Moreover, in the drawings like reference numerals designate corresponding parts throughout the several views.

DETAILED DESCRIPTION OF PREFERRED EMBODIMENTS

Figure 1:
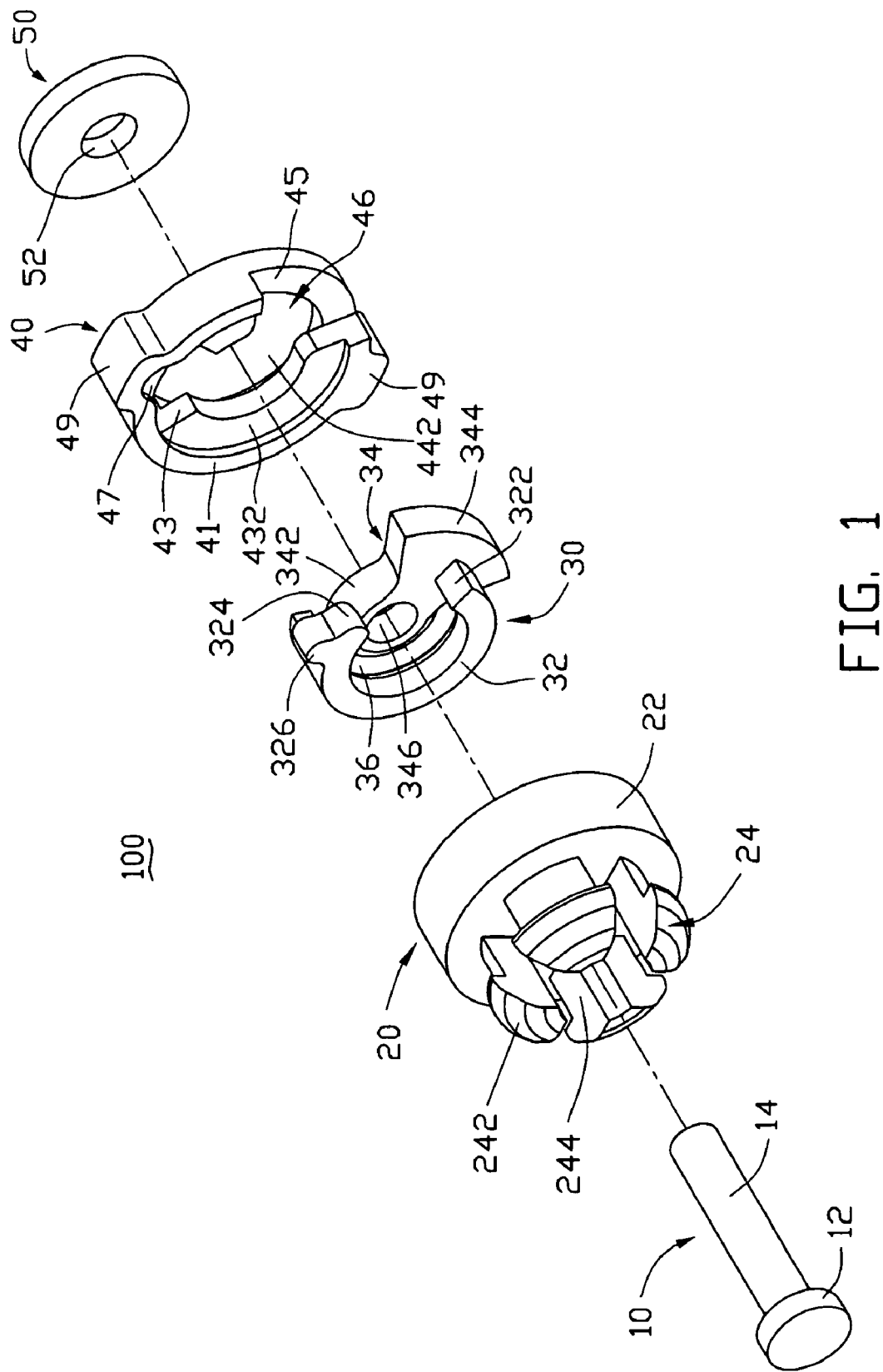
FIG. 1 is an exploded, isometric view of the multi-section hinge mechanism including a shaft, a rotary member, an elastic member, a base, and a cap, according to a preferred embodiment.

Referring now to the drawings, FIG. 1 shows a multi-section hinge mechanism 100 according to a first preferred embodiment of the present invention. The multi-section hinge mechanism 100 can be used to support a camera, such that the camera can be freely moved to a desired angle and stably aimed in a desired direction for taking a photograph. The multi-section hinge mechanism 100 also can be used to interconnect components like a body (not shown) and a cover (not shown) of a foldable electronic device. The multi-section hinge mechanism 100 includes a shaft 10, a rotary member 20, an elastic member 30, a base 40, and a cap 50. The shaft 10 extends through the rotary member 20, the elastic member 30, the base 40, and the cap 50 in that order, thereby integrating the multi-section hinge mechanism 100 together.

The shaft 10 may be made of plastic material. The shaft 10 includes a flange 12 disposed at one end thereof, and a shaft portion 14 integrally formed with the flange 12.

Figure 2:
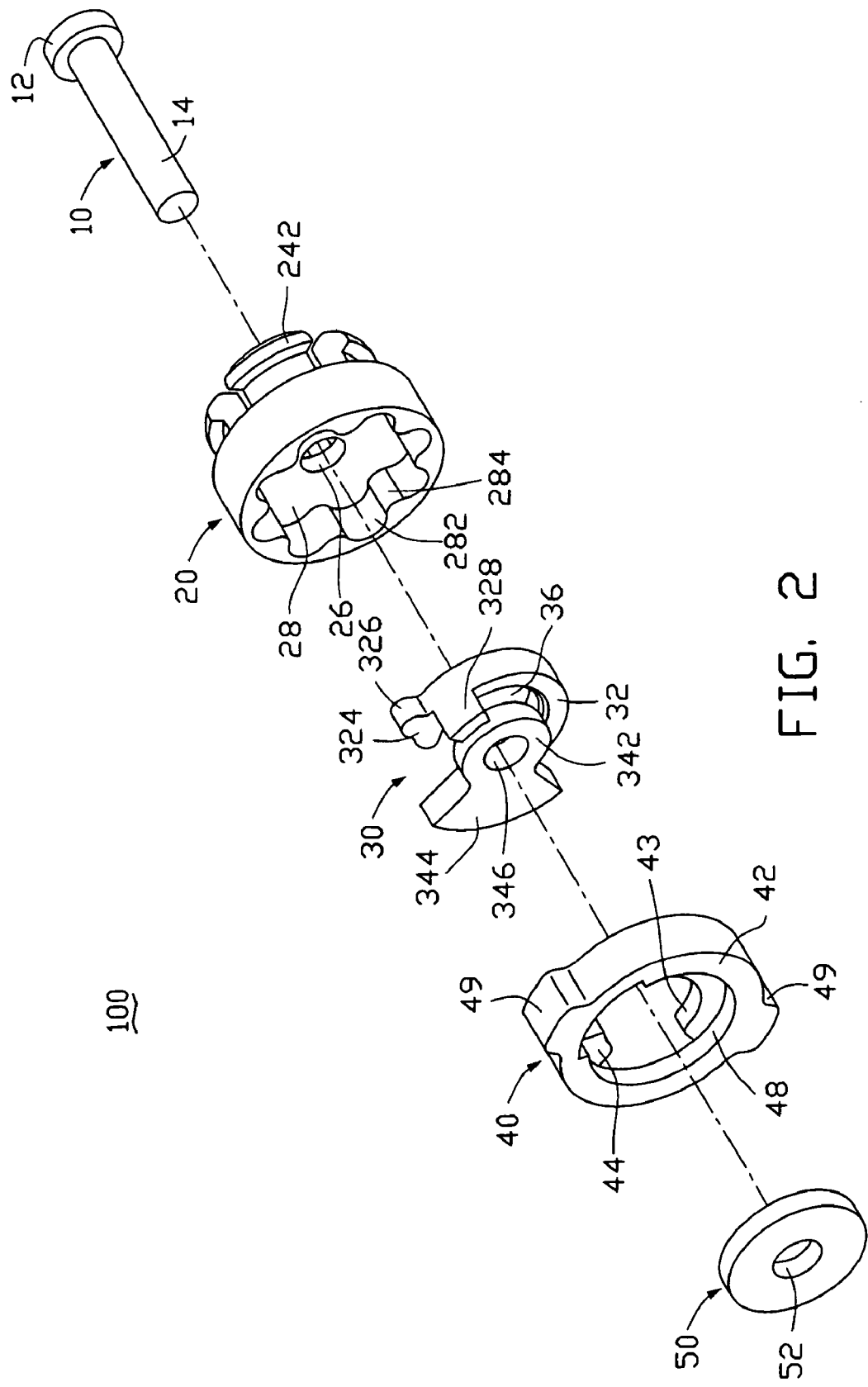
FIG. 2 is similar to FIG. 1, but shown from another aspect.
Figure 3:
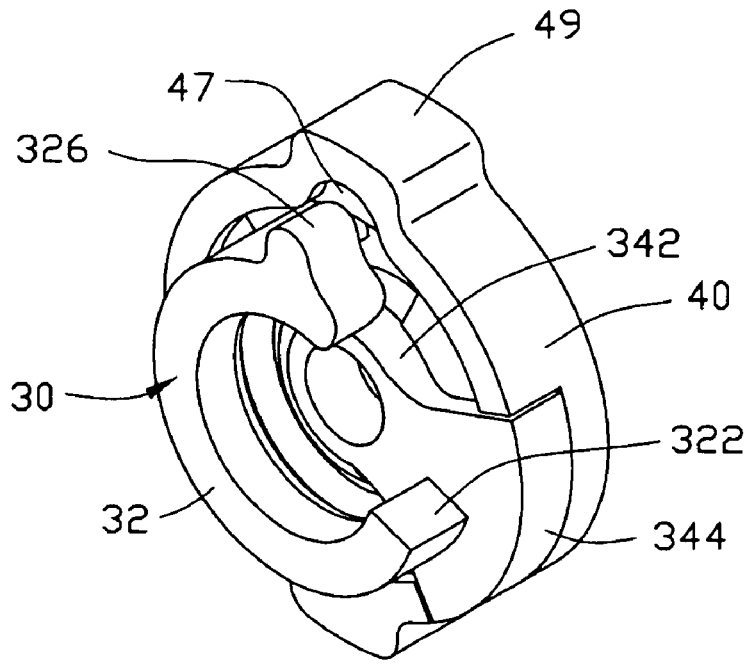
FIG. 3 is an assembled view of the elastic member and the base of the multi-section hinge mechanism shown in FIG. 2.
Figure 4:
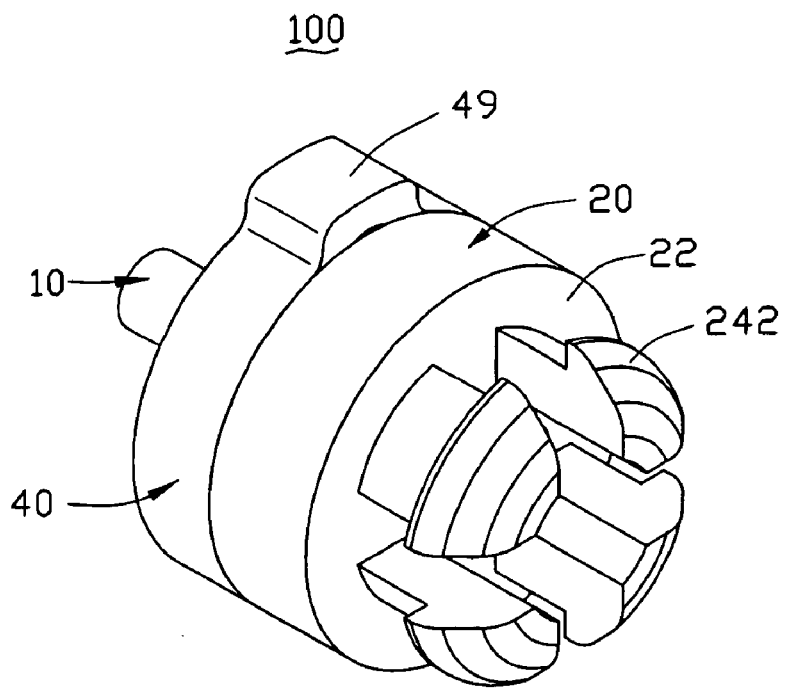
FIG. 4 is an assembled view of the multi-section hinge mechanism shown in FIG. 2.
Figure 5:
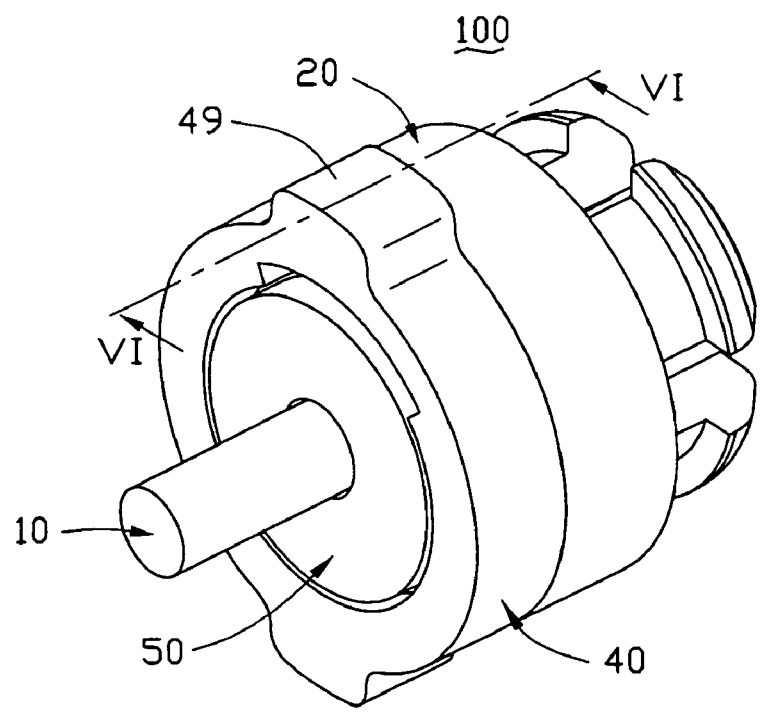
FIG. 5 is similar to FIG. 3, but shown from another aspect.
Figure 6:
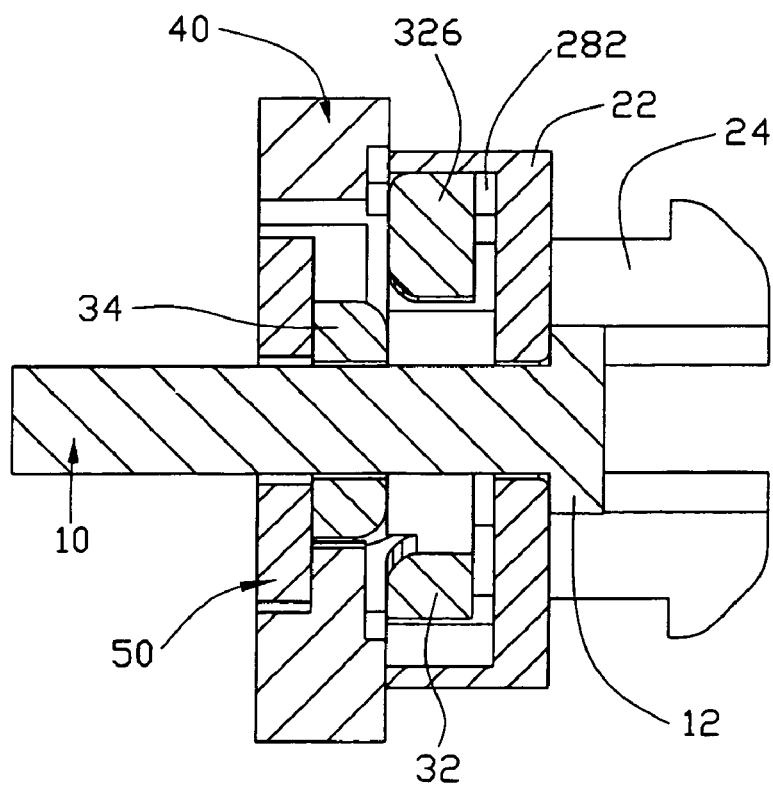
FIG. 6 is a cross-sectional view taken along VI-VI line of FIG. 5.

Referring also to FIG. 2, the rotary member 20 includes a disk 22, a crosshead 24 as a securing portion, and a through hole 26 running through the disk 22 and the crosshead 24. The crosshead 24 extends perpendicularly from a first end surface of the disk 22, and is integrally formed with the disk 22. The crosshead 22 includes four symmetrical jaws 242, all of which are evenly spaced from each other. The jaws 242 are barb-shaped, and are provided on a same circumference. The jaws 242 and the disk 22 cooperatively define a circular receiving space 244. A diameter of the circular receiving space 244 is similar to a diameter of the flange 12 of the shaft 10, and larger than a diameter of the through hole 26. The circular receiving space 244 is configured for receiving the flange 12 of the shaft 10. The disk 22 has a round groove 28 defined in an opposite second end surface, and communicating with the through hole 26. A plurality of regularly spaced arcuate concaves 282 are defined in an inner circumferential surface portion of the disk 22. A plurality of arcuate convexes 284 are thus defined between each two adjacent arcuate concaves 282.

The elastic member 30 includes an annular elastic arm 32 with an opening, and a fanlike part 34. The fanlike part 34 is located at a bottom of the elastic arm 32, and is integrally formed with the elastic arm 32. The elastic arm 32 has a first end 322 and a second end 324. The opening is defined between the first end 322 and the second end 324. The first end 322 connects with the fanlike part 34. The elastic arm 32 has an arcuate protrusion 326 extending from an outer periphery thereof and adjacent to the second end 324. The elastic arm 32 is provided with a latching block 328 extending therefrom toward the fanlike part 34 and adjacent to the arcuate protrusion 326. The fanlike part 34 includes a central portion 342 and a fanlike edge portion 344 extending from the central portion 342. The central portion 342 has a central hole 346 defined therein. A diameter of the central hole 346 corresponds to a diameter of the shaft portion 14 of the shaft 10. A diameter of the fanlike part 34 is larger than an outer diameter of the elastic arm 32. A diameter of the central portion 342 is less than an inner diameter of the elastic arm 32, thus defining a clearance 36 therebetween. The elastic arm 32 can move in the clearance 36.

The base 40 is a hollow cylinder with two open ends, and may be made of plastic material. The base 40 includes a first end portion 41 and a second end portion 42. The base 40 is provided with a first circular partition 43 and a second circular partition 44 disposed adjacent to the first end portion 41. A circumference of the first partition 43 is larger than that of the second partition 44. The first partition 43 and the second partition 44 are arranged so as to face each other and are disposed on a same circle, thus forming a round hole 442 therebetween. The first partition 43 and an inner periphery of the base 40 cooperatively form a recess 432, which faces the first end portion 41. The first end portion 41 has a cutout 45 defined therein communicating with the round hole 442. The round hole 442 and the cutout 45 cooperatively form a fanlike receiving space 46 configured for securely receiving the fanlike part 34 of the elastic member 30. The base 40 has an arcuate recess 47 defined in the first end portion 41 and located between the first partition 43 and the second partition 44, for receiving a portion of the arcuate protrusion 326 of the elastic member 30. The second end portion 42 defines a containing groove 48 communicating with the receiving space 46, for containing the cap 50. The base 40 further includes two arcuate projections 49 which function as fixing projections, and which are symmetrically provided on an outer circumferential surface of the base 40.

The cap 50 is disk-shaped, and contained in the containing groove 48 of the base 40. The cap 50 has a central opening 52 defined therein, for the shaft portion 14 of the shaft 10 to extend through.

Referring to FIGS. 3-6, in assembly of the multi-section hinge mechanism 100, the elastic member 30 is locked on the base 40, with the fanlike part 34 received in the fanlike receiving space of the base 40. A portion of the elastic arm 32 is received in the recess 432, and abuts the first partition 43. The latching block 328 is located between the first partition 43 and the arcuate recess 47. The cap 50 is received in the containing groove 48 of the base 40. The shaft portion 14 of the shaft 10 extends through the crosshead 22 and the through hole 26 of the rotary member 20, the central hole 346 of the elastic member 30, the base 40, and the central opening 52 of the cap 50 in that order, with the elastic arm 32 of the elastic member 30 received in the circular groove 28 of the rotary member 20. In this state, the arcuate protrusion 326 of the elastic member engages in one of the arcuate concaves 282. Lastly, the cap 50 is fixed onto said one end of the shaft portion 14 by welding/melting.

In use of the multi-section hinge mechanism 100, the base 40 may be fixed to a first body via the arcuate projections 49. The rotary member 20 may be fixed to a camera via the crosshead 22. The camera can be manually rotated by a user. Rotation of the camera causes the rotary member 20 to rotate as well, because of a connection between the rotary member 20 and the camera. Hence, the elastic arm 32 of the elastic member 30 rotates relative to the rotary member 20. Accordingly, the arcuate protrusion 326 of the elastic arm 232 rotates out from the arcuate concave 282 to an adjoining arcuate convex 284 adjacent the arcuate concave 282. At this time, the elastic arm 32 of the rotary member 30 is in an elastically deformed state and moves in the clearance 36, with the arcuate protrusion 326 pressing on the arcuate convex 284 of the rotary member 20. Once the arcuate protrusion 326 has ridden over a peak of the arcuate convex 284, the elastic force exerted by the elastic arm 32 drives the arcuate protrusion 326 to move from the arcuate convex 284 and enter the adjacent arcuate concave 3282. The arcuate protrusion 326 thus becomes stably locked in the adjacent arcuate concave 282. Furthermore, the above-described process can be repeated a desired number of times according to the user's requirement, with the arcuate protrusion 326 finally settling in a desired one of the arcuate concaves 282. That is, the rotary member 20 can be rotated to any of various angles needed for the user's requirement.

In alternative embodiments, the flanges 12 of the shaft 10 can be omitted. The cap 50 may be riveted to the shaft 10, instead of using welding/melting. Also, the cap 50 may be omitted. Thus, the containing groove 48 of the base 40 may be omitted. The base 40 may define a round hole, thus the shaft portion 14 of the shaft 10 extends securely through the hole by melting or riveting.

In further alternative embodiment, the base 40 may be omitted. In this embodiment, the rotary member 20 may be fixed to a camera via the crosshead 22, and the elastic member 30 may be fixed to the first body via the fanlike part 34.

The multi-section hinge mechanism can be used not only in a camera rotation mechanism of a foldable electronic device to achieve rotation and orientation of a camera to a desired angle, but also in a foldable electronic device to connect a main body and a cover thereof and achieve rotation and orientation of the cover relative to the main body. The rotary member 20 is secured in the cover via the crosshead 22. The base 40 is secured in the main body via the arcuate projections 49. The cover is folded down or unfolded up from the main body via the rotating member 20 rotating about the base 40.

A main advantage of the multi-section hinge mechanism is that the multi-section hinge mechanism occupies a relatively small volume. Accordingly, the space required in an application such as a camera rotating mechanism or a mobile phone is reduced. In addition, the multi-section hinge mechanism can achieve rotation to any of a variety of different angles and thus be stably aimed in a desired direction. Furthermore, the hinge mechanism is modularized, which makes it easy to use in mass production assembly of foldable electronic devices such as mobile phones.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge assembly, comprising:
a shaft including a flange disposed at one end thereof;
a rotary member defining a through hole running therethrough, the shaft rotatably received in the through hole, the rotary member having a groove defined therein by an inner circumferential surface portion thereof, the rotary member defining a plurality of concaves in the inner circumferential surface portion, the rotary member further comprising a securing portion, the securing portion comprising a plurality of jaws spaced apart from each other and defining a receiving space therebetween, and the flange received and locked in the receiving space;
an elastic member including an elastic arm and a fixing portion, the elastic arm being received in the groove and selectively engaging in one of the concaves of the rotary member, the shaft extending through the elastic member; and
a base non-rotatably connecting with the fixing portion of the elastic member, the base defining a hole in which the shaft is securely received.

2. The multi-section hinge mechanism as claimed in claim 1, wherein the rotary member includes a disk, the groove is defined in one end of the disk.

3. The multi-section hinge mechanism as claimed in claim 2, wherein the securing portion is integrally formed at another end of the disk.

4. The multi-section hinge mechanism as claimed in claim 3, wherein the securing portion is a crosshead.

5. The multi-section hinge mechanism as claimed in claim 1, wherein the elastic arm is an annular arm with an opening, the elastic arm has a first end and a second end, the elastic arm having an arcuate protrusion on an outer periphery thereof adjacent to the second end, the elastic arm engaging in one of the concaves of the rotary member via the arcuate protrusion.

6. The multi-section hinge mechanism as claimed in claim 5, wherein the fixing portion of the elastic member is a fanlike section including a central portion and a fanlike edge portion extending from the central portion, the first end being securely connected to one surface of the fanlike end portion.

7. The multi-section hinge mechanism as claimed in claim 6, wherein the base defines a receiving space corresponding to the fanlike part of the elastic member, the fanlike part of the elastic member non-rotatably received in the receiving space.

8. The multi-section hinge mechanism as claimed in claim 7, wherein the base includes a first end portion and a second end portion, the base is provided a first circular partition and an opposing second circular partition disposed adjacent to the first end portion, wherein the first partition and the second partition cooperatively form a round hole therebetween.

9. The multi-section hinge mechanism as claimed in claim 8, wherein the first end portion has a cutout defined therein and communicating with the round hole, the round hole and the cutout cooperatively form the receiving space.

10. The multi-section hinge mechanism as claimed in claim 8, wherein the second end portion of the base defines a containing groove communicating with the receiving space.

11. The multi-section hinge mechanism as claimed in claim 10, further comprising a cap received in the containing groove.

12. The multi-section hinge mechanism as claimed in claim 11, wherein the cap has a central opening securely receiving the shaft.

13. The multi-section hinge mechanism as claimed in claim 1, wherein at least one fixing projection is provided on an outer wall of the base.

14. A multi-section hinge mechanism, comprising:
a shaft including a flange disposed at one end thereof;
a rotary member defining a through hole extending therethrough, the shaft rotatably received in the through hole, the rotary member defining a plurality of concaves in an inner circumferential surface portion thereof, the rotary member further comprising a securing portion the securing portion comprising a plurality of jaws spaced apart from each other and defining a receiving space therebetween, and the flange received and locked in the receiving space; and
an elastic member including an elastic arm and a fixing portion, the elastic arm engaging in one of the concaves of the rotary member, the shaft non-rotatably connecting with the fixing portion of the elastic member.

15. The multi-section hinge mechanism as claimed in claim 14, wherein the rotary member includes a disk, the groove is defined in one end of the disk.

16. The multi-section hinge mechanism as claimed in claim 15, wherein the securing portion is integrally formed at another end of the disk.

17. The multi-section hinge mechanism as claimed in claim 16, wherein the securing portion is a crosshead.

18. The multi-section hinge mechanism as claimed in claim 14, wherein the elastic arm is an annular arm with an opening, the elastic arm has a first end and a second end, the elastic arm has an arcuate protrusion on an outer periphery thereof adjacent to die second end, the elastic arm engaging in one of the concaves of the rotary member via the arcuate protrusion.

19. The multi-section hinge mechanism as claimed in claim 18, wherein the fixing portion of the elastic member is a fanlike part including a central portion and a fanlike edge portion extending from the central portion, the first end securely connected to one surface of the fanlike end portion.

* * * * *

UNITED STATES PATENT AND TRADEMARK OFFICE
CERTIFICATE OF CORRECTION

PATENT NO.        : 7,607,201 B2                                      Page 1 of 1
APPLICATION NO.   : 11/450193
DATED             : October 27, 2009
INVENTOR(S)       : Chun-jen Lin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 684 days.

Signed and Sealed this

Twelfth Day of October, 2010

David J. Kappos
*Director of the United States Patent and Trademark Office*